United States Patent
Clark, Jr. et al.

(10) Patent No.: US 7,736,053 B2
(45) Date of Patent: Jun. 15, 2010

(54) BOLOMETRIC ON-CHIP TEMPERATURE SENSOR

(75) Inventors: William F. Clark, Jr., Essex Junction, VT (US); Edward J. Nowak, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 12/348,974

(22) Filed: Jan. 6, 2009

(65) Prior Publication Data

US 2009/0110023 A1  Apr. 30, 2009

Related U.S. Application Data

(62) Division of application No. 11/381,427, filed on May 3, 2006, now Pat. No. 7,484,886.

(51) Int. Cl.
- *G01K 3/06* (2006.01)
- *G01K 7/00* (2006.01)
- *G01K 15/00* (2006.01)
- *G01K 17/00* (2006.01)

(52) U.S. Cl. ............ 374/170; 374/1; 374/164; 374/137; 374/29; 702/130; 702/99

(58) Field of Classification Search .......... 374/4, 374/5, 29–30, 31, 32, 33, 110–115, 137, 374/141, 170–173, 178, 179, 163, 164, 183, 374/1; 702/130–136, 99
See application file for complete search history.

(56) References Cited

U.S. PATENT DOCUMENTS

| | | | |
|---|---|---|---|
| 4,791,380 A * | 12/1988 | Chiappetta | 329/352 |
| 5,422,832 A * | 6/1995 | Moyal | 702/132 |
| 5,466,484 A | 11/1995 | Spraggins et al. | |
| 5,719,378 A | 2/1998 | Jackson, Jr. et al. | |
| 5,775,809 A | 7/1998 | Cooley et al. | |
| 5,859,560 A * | 1/1999 | Matthews | 327/513 |
| 5,867,054 A * | 2/1999 | Kotowski | 327/513 |
| 6,111,280 A | 8/2000 | Gardner et al. | |
| 6,151,560 A | 11/2000 | Jones | |
| 6,526,360 B1 | 2/2003 | Ito et al. | |
| 6,827,487 B2 | 12/2004 | Baumbach | |
| 6,866,391 B2 | 3/2005 | Krausse | |
| 6,876,250 B2 * | 4/2005 | Hsu et al. | 327/539 |
| 6,908,227 B2 * | 6/2005 | Rusu et al. | 374/141 |
| 6,996,491 B2 * | 2/2006 | Gold et al. | 702/132 |
| 7,118,273 B1 * | 10/2006 | Schnaitter | 374/168 |
| 7,489,184 B2 * | 2/2009 | Pan et al. | 327/539 |
| 2001/0021217 A1 * | 9/2001 | Gunther et al. | 374/178 |

(Continued)

*Primary Examiner*—Gail Verbitsky
(74) *Attorney, Agent, or Firm*—Gibb I.P. Law Firm, LLC; Anthony J. Canale

(57) ABSTRACT

Disclosed are embodiments of an improved on-chip temperature sensing circuit, based on bolometry, which provides self calibration of the on-chip temperature sensors for ideality and an associated method of sensing temperature at a specific on-chip location. The circuit comprises a temperature sensor, an identical reference sensor with a thermally coupled heater and a comparator. The comparator is adapted to receive and compare the outputs from both the temperature and reference sensors and to drive the heater with current until the outputs match. Based on the current forced into the heater, the temperature rise of the reference sensor can be calculated, which in this state, is equal to that of the temperature sensor.

12 Claims, 7 Drawing Sheets

U.S. PATENT DOCUMENTS

| | | |
|---|---|---|
| 2002/0133789 A1 | 9/2002 | Hsu et al. |
| 2003/0091089 A1 | 5/2003 | Krausse |
| 2003/0141569 A1 | 7/2003 | Fried et al. |
| 2003/0142724 A1* | 7/2003 | Barth et al. .................. 374/178 |
| 2003/0219719 A1* | 11/2003 | Bowman et al. ................ 435/4 |
| 2004/0008754 A1 | 1/2004 | Clabes et al. |
| 2004/0042529 A1 | 3/2004 | Covi et al. |
| 2004/0076215 A1* | 4/2004 | Baumbach .................... 374/29 |
| 2004/0150417 A1 | 8/2004 | Paulos |
| 2005/0013595 A1* | 1/2005 | Israelson et al. ............ 392/449 |
| 2005/0072926 A1 | 4/2005 | Nassiopoulou et al. |
| 2005/0074051 A1 | 4/2005 | Won et al. |
| 2005/0093617 A1 | 5/2005 | Min et al. |
| 2005/0104674 A1 | 5/2005 | Norman et al. |
| 2005/0179575 A1 | 8/2005 | McLeod et al. |
| 2005/0220171 A1 | 10/2005 | Faour et al. |
| 2006/0164111 A1 | 7/2006 | Lopez et al. |
| 2009/0285261 A1* | 11/2009 | Casey et al. ................. 374/178 |

* cited by examiner

BOLOMETRIC ON-CHIP TEMPERATURE SENSOR

CROSS-REFERENCE TO RELATED APPLICATIONS

This application is a divisional of U.S. application Ser. No. 11/381,427 filed May 3, 2006, the complete disclosure of which in incorporated herewith.

BACKGROUND

1. Field of the Invention

The embodiments of the invention generally relate to on-chip temperature sensors, and more particularly, to an improved on-chip temperature circuit based on bolometry.

2. Description of the Related Art

On-chip temperature sensors are used for various purposes in very large scale integrated circuit (VLSI) technology. For example, temperature sensors are often used to trigger evasive actions to avoid overheating or for diagnostic purposes. Such thermal sensors can take many forms. For example, resistors, diodes, or any other temperature sensitive elements can be used as thermal sensors. Typically, pn junction diodes have been used because of the nearly ideal behavior of the forward conduction state in such pn junction diodes. That is, $j=j0 \exp(Vf\ Qe/(n\ k\ T))$, $n \sim 1$. However, in silicon-on-insulator (SOI) technology, n is typically a few percent above unity and may also have a significant process tolerance. As a result, extra calibration measurements may be required in order to use this technique for temperature measurement in conjunction with SOI technology. Such extra calibration measurements increase the cost of implementation and, thus, limit the use of this temperature sensing technique. Therefore, there is a need in the art for an improved on-chip temperature sensor and, particularly, for an improved on-chip sensor suitable for use in SOI technology.

SUMMARY

In view of the foregoing, disclosed are embodiments of an improved on-chip temperature sensing circuit, based on bolometry, which provides self calibration of the on-chip temperature sensors for ideality and an associated method of sensing temperature at a specific on-chip location. Embodiments of the circuit comprise a temperature sensor, an identical reference sensor with a thermally coupled heater and a comparator. The comparator is adapted to receive and compare the outputs from both the temperature and reference sensors and to drive the heater with current sufficient for the outputs to match. Based on the current forced into the heater, the temperature rise of the reference sensor can be calculated, which in this state, is equal to that of the temperature sensor.

More particularly, disclosed herein are embodiments of an on-chip temperature sensing circuit that comprises a comparator (e.g., an operational amplifier), at least one temperature sensor (i.e., at least one first temperature sensor), a reference sensor (i.e., a second temperature sensor), a heater that is thermally coupled to the reference sensor and driven by the output current from the comparator.

In all embodiments of the invention, the temperature and reference sensors of the circuit should be identical and can comprise any suitable temperature sensitive element. That is, the temperature and reference sensors should comprise structures adapted to produce outputs (i.e., first and second outputs, respectively) that are temperature-sensitive. For example, the sensors can comprise thermistors or temperature sensitive diodes.

In one embodiment of the invention, the circuit comprises a single temperature sensor and a single reference sensor, each of which is electrically connected directly to the comparator. In another embodiment of the invention, the circuit comprises multiple temperature sensors and a single reference sensor. The reference sensor is connected directly to the comparator. The multiple temperature sensors are electrically connected to a multiplexer, which is adapted to selectively connect the temperature sensors to the comparator one at a time. Thus, in each of these embodiments the comparator is adapted to receive and compare the outputs transmitted from a single temperature sensor (i.e., a first temperature sensor) and a single reference sensor (i.e., a second temperature sensor).

As mentioned above, the circuit comprises a heater that is thermally coupled to the reference sensor and is powered by the output current from the comparator. An exemplary heater can comprise a diffused semiconductor mesa on a dielectric layer above a wafer substrate. For example, the heater can comprise an N+ or P+ doped silicon mesa above the buried oxide layer of a silicon-on-insulator (SOI) or bulk wafer. The reference sensor can be embedded in the diffused silicon mesa so that it is thermally coupled to the heater. Electrodes can connect to opposing sides of the diffused silicon mesa so that the mesa can receive the output current from the comparator and, specifically, so that the current can be passed through the heater and raise the temperature at the reference sensor. Isolation structures can surround the sidewalls of the diffused mesa to electrically isolate the heater from other features or devices that are also positioned above the dielectric layer. Similarly, isolation structures can surround the sidewalls of the embedded reference sensor to electrically isolate the reference sensor from the current flowing through the heater. Additionally, in order to ensure that the heater works with predictable and reproducible joule-heating characteristics in SOI technology (i.e., to ensure that the heater works independent of process variations), the diffused silicon mesa can be formed such that its length and width are each significantly less than the thickness of the substrate but greater than the thickness of the buried oxide layer.

Another exemplary heater can comprise a diffused polysilicon mesa on a semiconductor layer above a dielectric layer and wafer substrate. For example, the heater can comprise an N+ or P+ doped polysilicon mesa immediately above a silicon layer on a buried oxide layer of a silicon-on-insulator (SOI) or bulk wafer. The reference sensor can be embedded within the silicon layer directly below the polysilicon mesa so that it is thermally coupled to the heater. Thermal coupling can be enhanced if the polysilicon mesa overlaps diffused silicon in the silicon layer adjacent to the reference sensor. Electrodes can connect to opposing sides of the polysilicon mesa so that the mesa can receive the output current from the comparator and, specifically, so that the current can be passed through the heater and raise the temperature at the reference sensor. Isolation structures can surround the sidewalls of the polysilicon mesa to electrically isolate the heater. Similarly, isolation structures can surround the sidewalls of the embedded reference sensor to electrically isolate the reference sensor from the current flowing through the heater. Additionally, in order to ensure that the heater works with predictable and reproducible joule-heating characteristics in SOI technology (i.e., to ensure that the heater works independent of process variations), the diffused polysilicon mesa can be formed such that its length and width are each less than the thickness of the substrate but greater than the thickness of the buried oxide layer.

In all embodiments of the invention, the comparator is also electrically connected to heater and drives the heater until the sensor outputs match (i.e., until the output of the reference sensor is equal to the output of the temperature sensor). Additionally, the circuit can further comprise a register that is adapted to record the amount of current required to drive the heater so that second output equals the first output. Based on the recorded amount of current forced into the heater, the temperature rise of the reference sensor can be calculated, which in this state, is equal to that of the temperature sensor.

Also disclosed are embodiments of a method of determining a temperature (i.e., a first temperature) at a specified on-chip location (i.e., a first location) by using an on-chip temperature sensing circuit. An embodiment of the method comprises forming the on-chip temperature sensing circuit, as described above. Specifically, the circuit can be formed so that the temperature at a reference sensor (i.e., a second temperature) can be raised independent of process variations. This can be accomplished, for example, by forming a heater with a diffused semiconductor mesa above a buried oxide layer and a substrate of a chip. If the length and width of the semiconductor mesa are formed so that they are each less than the thickness of the substrate and are each greater the thickness of the buried oxide layer, then the temperature at the reference sensor will be independent of the process variations.

Once the circuit is formed, it can be calibrated. More specifically, if the circuit is formed such that the second temperature can be raised independent of process variations, then the circuit only needs to be calibrated one time. Calibrating the circuit can be accomplished by heating the entire chip and measuring the output of the reference sensor (i.e., a first value for the second output is determined). After the chip has cooled, power is applied to the heater to raise the temperature just at the reference sensor. Then, the output of the reference sensor is again measured (i.e., a second value for the second output is determined). A temperature rise in response to the power applied to the heater can be calibrated based on the first and second values.

Once the circuit is calibrated, the first output of the temperature sensor (i.e., the first temperature sensor) at a first location on the chip can be compared by the comparator to the second output of the reference sensor (i.e., the second temperature sensor). Then, the temperature at the reference sensor (i.e., the second temperature at the second location) is raised (e.g., by applying power to the heater and, specifically, by directing the output current of the comparator into the heater) until the first output equals the second output. The amount of power required to raise the second temperature until the first and second outputs are equal can be determined by measuring the current input into the heater. Based on this amount of power required, the temperature at the first temperature sensor can be determined.

These and other aspects of the embodiments of the invention will be better appreciated and understood when considered in conjunction with the following description and the accompanying drawings. It should be understood, however, that the following descriptions are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
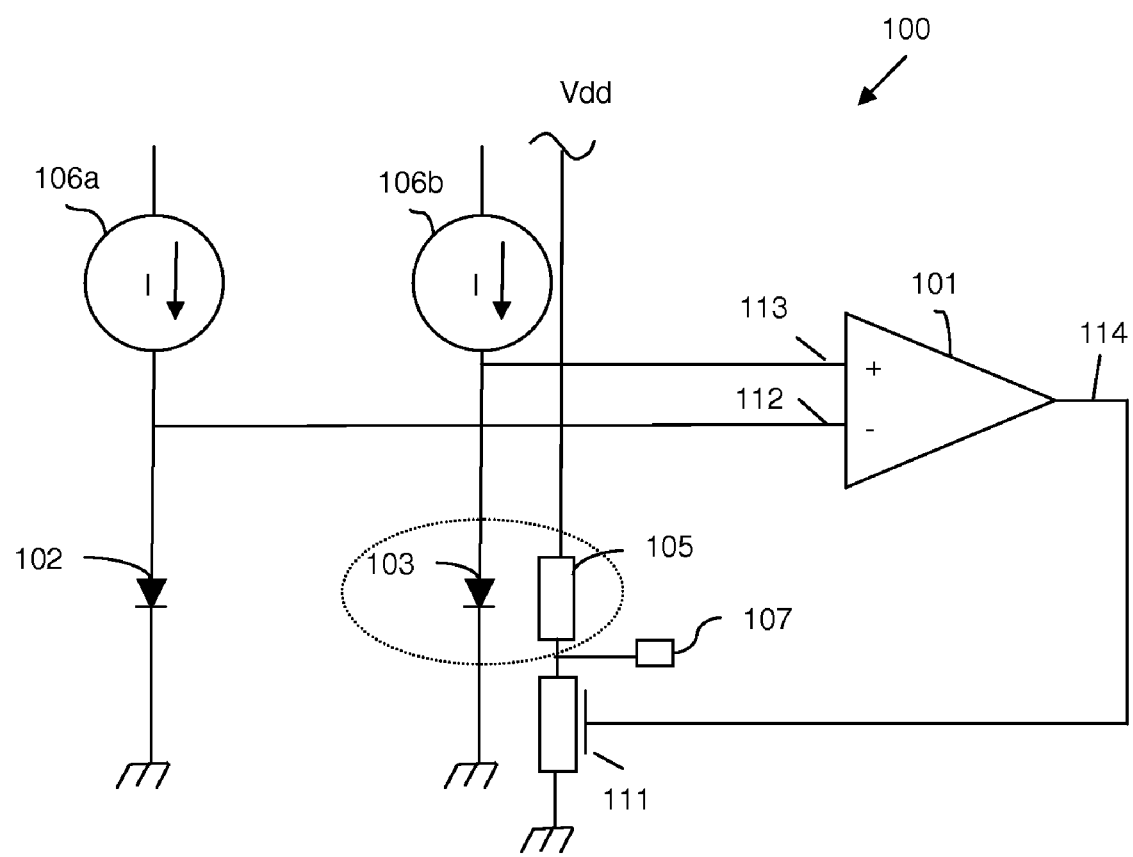
FIG. 1 is a schematic diagram illustrating an embodiment of the temperature sensing circuit of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, with pn junction diode temperature sensors in silicon-on-insulator (SOI) technology, n is typically a few percent above unity and may also have a significant process tolerance. As a result, extra calibration measurements may be required in order to use this technique for temperature measurement in conjunction with SOI technology. Such extra calibration measurements increase the cost of implementation and, thus, limit the use of this temperature sensing technique. Therefore, there is a need in the art for an improved on-chip temperature sensor and, particularly, for an improved on-chip sensor suitable for use in SOI technology.

In view of the foregoing, disclosed are embodiments of an improved on-chip temperature sensing circuit, based on bolometry, which provides self calibration of the on-chip temperature sensors and an associated method of sensing temperature at a specific on-chip location. The circuit comprises a temperature sensor, an identical reference sensor with a thermally coupled heater and a comparator. The comparator is adapted to receive and compare the outputs from both the temperature and reference sensors and to drive the heater with current until the outputs match. Based on the current forced into the heater, the temperature rise of the reference sensor can be calculated, which in this state, is equal to that of the temperature sensor.

Figure 2:
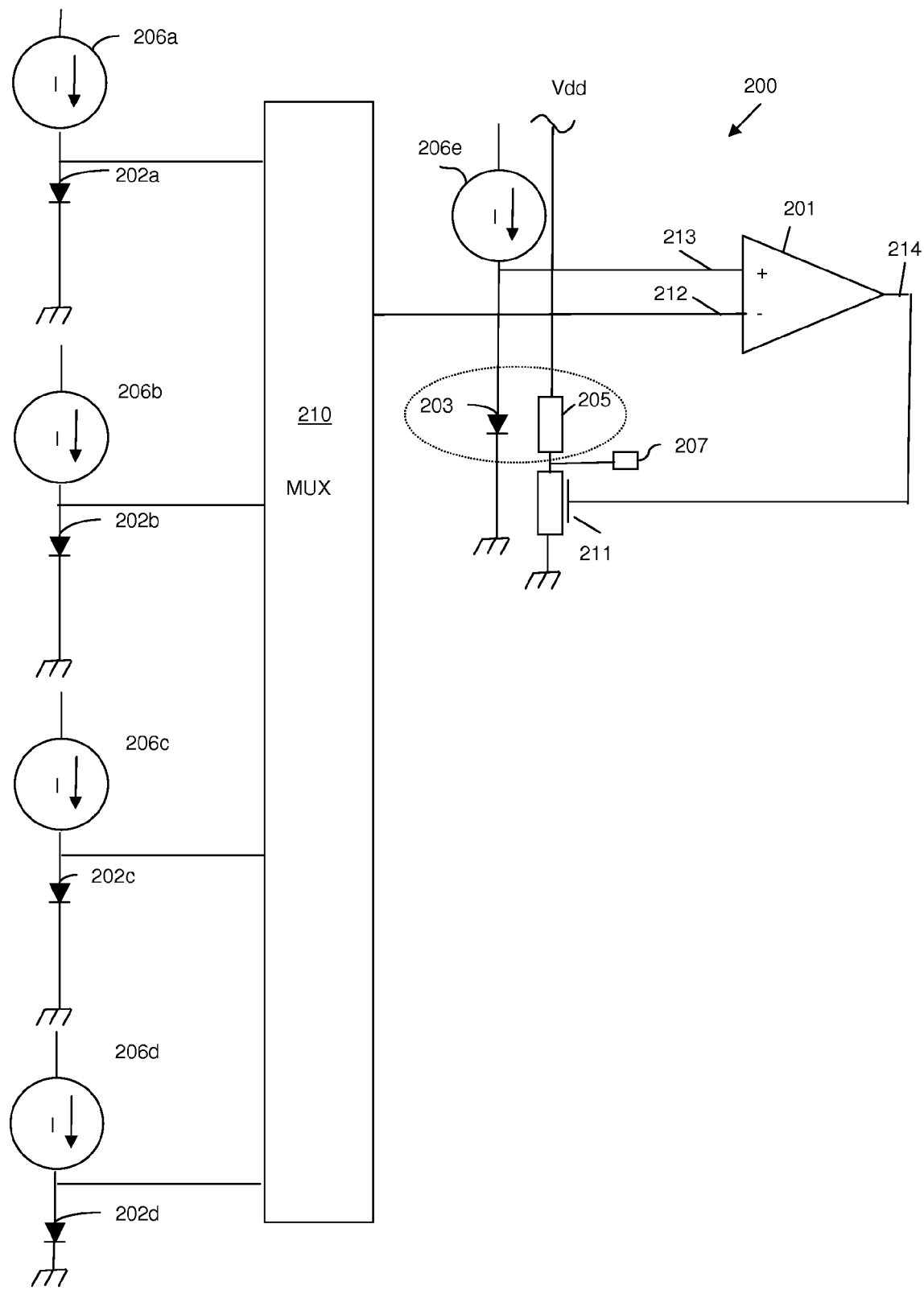
FIG. 2 is a schematic diagram illustrating another embodiment of the temperature sensing circuit of the invention.

More particularly, disclosed herein and illustrated in FIGS. 1 and 2, are embodiments of an on-chip temperature sensing circuit (see circuit 100 of FIG. 1 and circuit 200 of FIG. 2). Each of these circuits 100 and 200 comprise a comparator 101, 201 (e.g., an operational amplifier), at least one temperature sensor 102, 202a-d (i.e., at least one first temperature sensor), first current source(s) 106a, 206a-d to bias the first temperature sensor(s), a reference sensor 103, 203 (i.e., a second temperature sensor), a second current source 106b, 206e to bias the reference sensor 103, 203, a heater 105, 205 that is thermally coupled to the reference sensor 103, 203 and driven by the output current 114, 214 from the comparator 101, 201. In one embodiment further elements 111, 211, comprising nFETs, form the output circuit of the comparator 101, 201 to ensure unidirectional current in the heater, 105, 205. This is to avoid a potential instability in the feedback loop.

In all embodiments of the invention, the temperature sensor (s) 102, 202a-d and reference sensor 103, 203 of the circuit 100, 200 should be identical and can comprise any suitable temperature sensitive element. That is, the temperature and reference sensors should comprise structures adapted to produce outputs (i.e., first outputs 112, 212 and second outputs 113, 213, respectively) that are temperature-sensitive. Thus, those skilled in the art will recognize that while the sensors illustrated in the circuit diagrams of FIGS. 1 and 2 are diodes (e.g., pn junction diodes), other suitable temperature sensitive elements, such as thermistors, bipolar transistors, or FETs, may also be used.

Referring particularly to FIG. 1, in one embodiment of the invention, the circuit 100 comprises a single temperature sensor 102 and a single reference sensor 103, both of which are electrically connected directly to the comparator 101. Referring particularly to FIG. 2, in another embodiment of the invention, the circuit 200 comprises multiple temperature sensors 202a-d and a single reference sensor 203. The reference sensor 203 is connected directly to the comparator 201. The multiple temperature sensors 202a-d are electrically connected to a multiplexer 210, which is adapted to selectively connect the temperature sensors 202a-d to the comparator 201 one at a time. Thus, in each of these embodiments the comparator 101, 201 is adapted to receive and compare the outputs transmitted from a single temperature sensor (i.e., a first output 112, 212 of a first temperature sensor 102, 202) and a single reference sensor (i.e., a second output 113, 213 of the second temperature sensor 103, 203). For example, if the temperature and reference sensors are pn junction diodes, then the comparator can be adapted to compare the forward bias voltages of these pn junction diodes.

As mentioned above, the circuit 100, 200 comprises a heater 105, 205 that is thermally coupled to the reference sensor 103, 203 and is powered by the current source 111, 211, which in turn comprises the output stage 114, 214 of the comparator 101, 201

Figure 3:
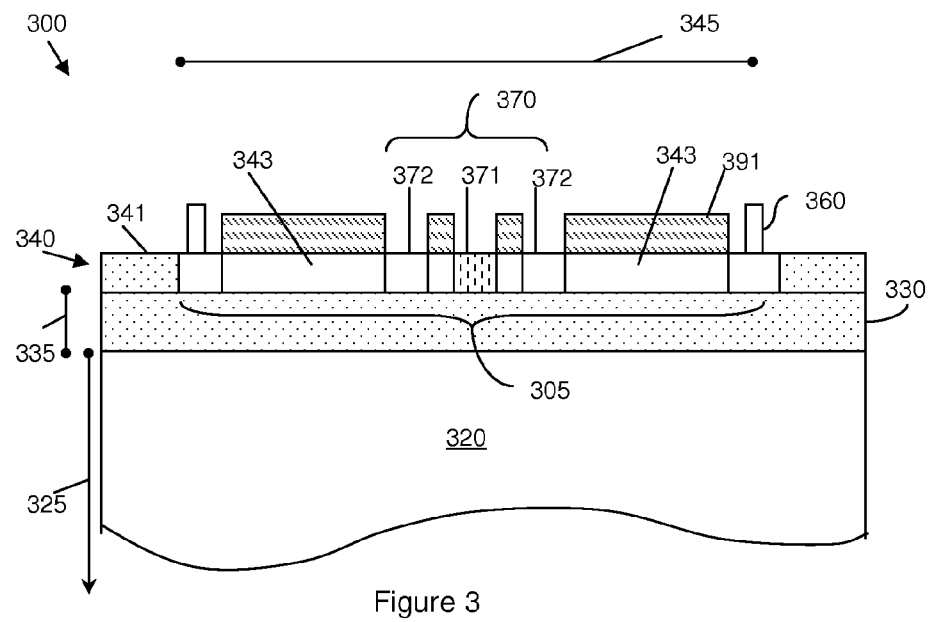
FIG. 3 is a diagram illustrating an exemplary heater/reference sensor structure suitable for incorporation into the temperature sensing circuits of FIG. 1 and FIG. 2.
Figure 4:
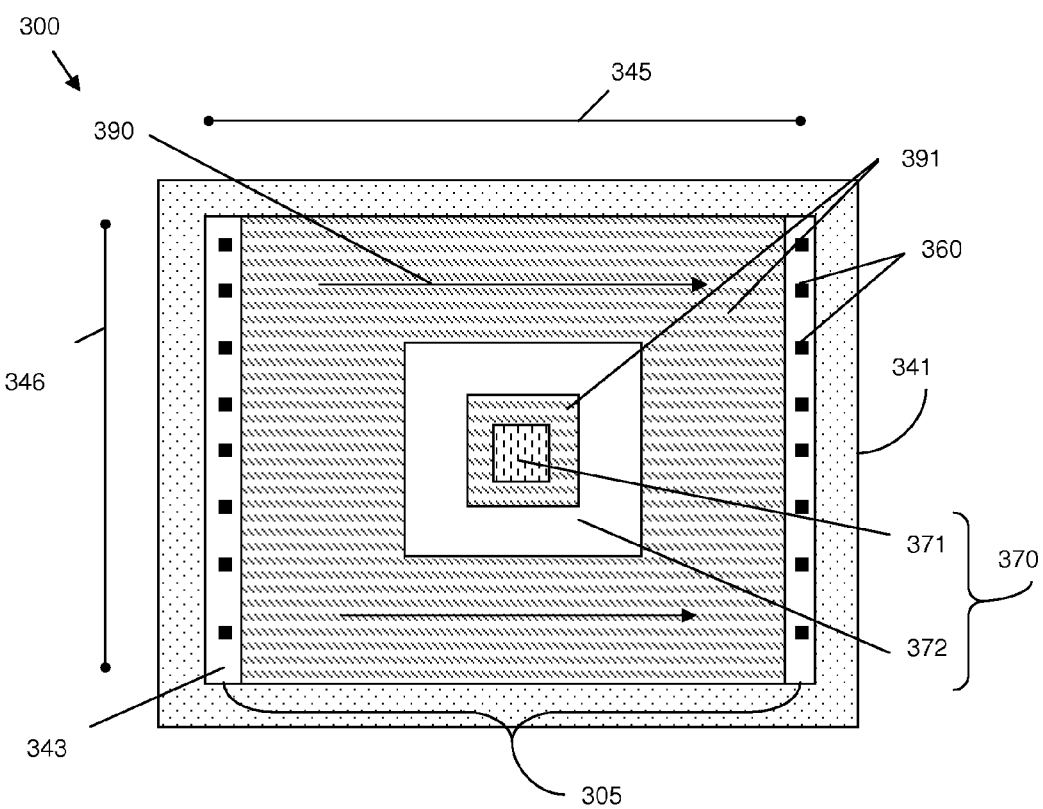
FIG. 4 is a diagram illustrating a top view of the structure of FIG. 3.

FIGS. 3 and 4 are side and top view diagrams, respectively, illustrating an exemplary heater/reference sensor structure 300 suitable for incorporation into the temperature sensing circuits 100 and 200 of FIGS. 1 and 2. In this structure 300, the heater 305 can comprise a diffused semiconductor mesa 343 on a dielectric layer 330 above a wafer substrate 320. For example, the heater can comprise an N+ or P+ doped silicon mesa 343 on a buried oxide layer 330 of a silicon-on-insulator (SOI) or bulk wafer.

The reference sensor 370 can be embedded in the diffused silicon mesa 343 above the buried oxide layer 330 so that it is thermally coupled to the heater 305. As illustrated, the reference sensor 370 comprises a pn junction diode that comprises a P+ diffusion region 371 adjacent to N+ diffusion regions 372 formed within the diffused silicon mesa 343 such that it is surrounded by the heater 305. However, as mentioned above, it is anticipated that the reference sensor 370 can comprise any other thermally sensitive element, such as a thermistor, bipolar transistor, or FET.

It should be noted that a protective layer 391 can be formed above the diffused silicon mesa 343 and within the reference sensor 370 to prevent silicide formation on exposed silicon, during subsequent processing. This protective layer 391 can comprise either a polysilicon layer above a thin dielectric or an insulator layer (e.g., a silicon nitride layer).

Electrodes 360 can connect to opposing sides of the heater 305 and specifically, to opposing sides of the diffused silicon mesa 343. These electrodes 360 allow the heater 305 to receive the output current 390 from the comparator and, specifically, allow the current 390 to pass through the diffused silicon mesa 343 and raise the temperature at the reference sensor 370. If the reference sensor 370 is a pn junction diode, as illustrated, then raising the temperature at the reference sensor 370 will effectively reduce the resistance through the diode, thereby, decreasing the forward bias voltage output. Contrarily, if the reference sensor is a thermistor (not shown), then an increase in temperature at the reference sensor will increase the resistance, thereby, increasing the output voltage.

Figure 5:
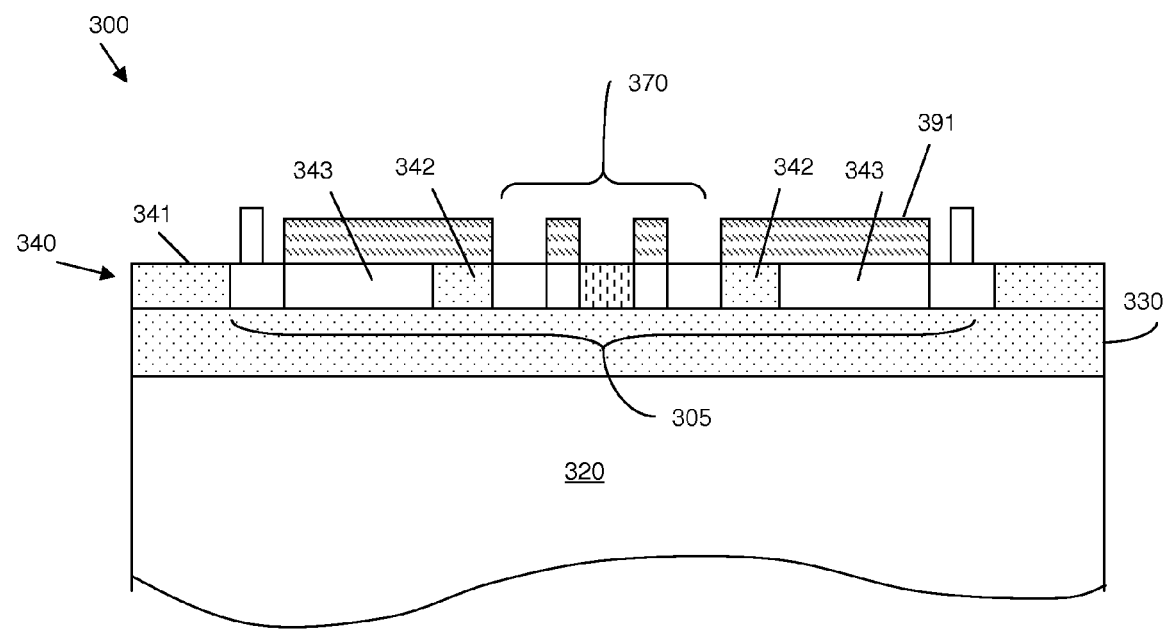
FIG. 5 is a diagram illustrating a variation on the structure of FIG. 3.

Isolation structures 341 (e.g., oxide or nitride filled shallow trench isolation (STI) structures) can surround the sidewalls of the diffused silicon mesa 343 to electrically isolate the heater 305 from other features or devices that are also positioned immediately above the buried oxide layer 330. Similarly, referring to FIG. 5, isolation structures 342 (e.g., oxide or nitride filled STI structures) can surround the sidewalls of the embedded reference sensor 370 to electrically isolate the reference sensor 370 from the current 390 flowing through the heater 305.

Additionally, in order to ensure that the heater 305 works with predictable and reproducible joule-heating characteristics in SOI technology (i.e., to ensure that the heater works independent of process variations), the diffused silicon mesa 343 can be formed such that its length 346 and width 345 are each less than the thickness 325 of the substrate 620 but greater than the thickness 335 of the buried oxide layer 330. More specifically, SOI technology, if the active silicon mesa 343 has physical length 346 (Lrx) and width 345 (Wrx) much greater than the BOX thickness 335 (Tbox), then the thermal conductivity to the bulk substrate 320 is dominated by the spreading path in the bulk and essentially independent of Tbox. Furthermore, if Lrx 346 and Wrx 345 are much smaller than the substrate thickness 325 (Tsx), then the spreading path is independent of Tsx and is only a function of Lrx and Wrx. Thus, the heater should be formed such that Tsx>>(Wrx, Lrx)>>Tbox. For example, the on-chip structure can be formed such that if Tsx is approximately equal to 400 um and Tbox is approximately equal to 0.1 um, then Lrx and Wrx of the silicon mesa 343 may be approximately 5 um.

Figure 6:
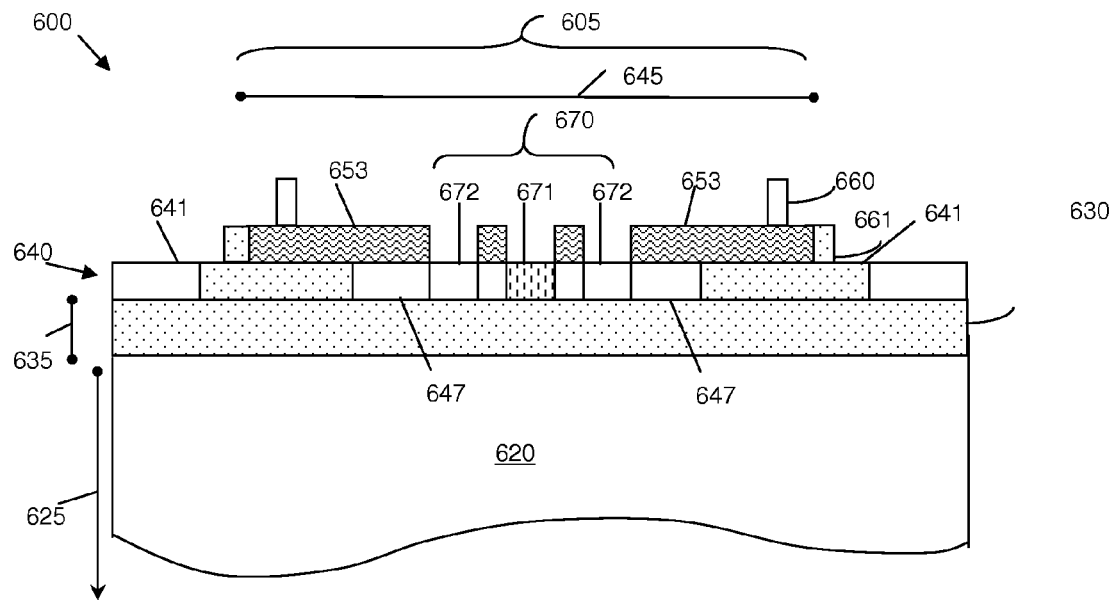
FIG. 6 is a diagram illustrating another exemplary heater/reference sensor structure suitable for incorporation into the temperature sensing circuits of FIG. 1 and FIG. 2.
Figure 7:
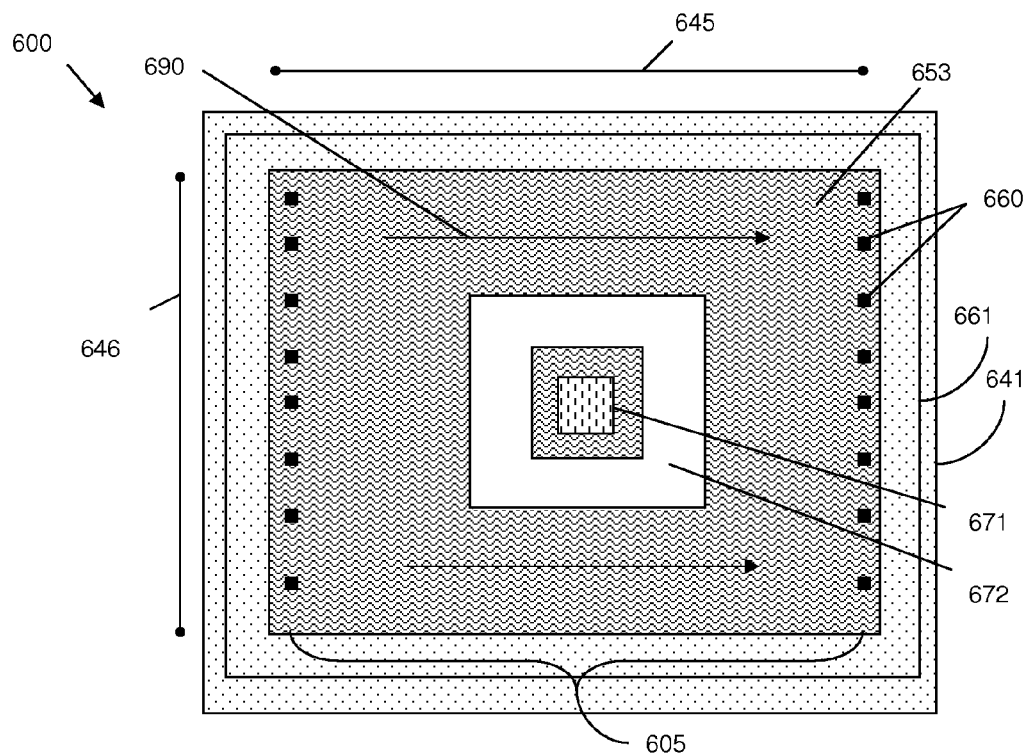
FIG. 7 is a diagram illustrating a top view of the structure of FIG. 6.

FIGS. 6 and 7 are side and top view diagrams illustrating another exemplary heater/reference sensor structure 600 that is also suitable for incorporation into the temperature sensing circuits 100 and 200 of FIGS. 1 and 2. In this structure 600, the heater 605 can comprise a diffused semiconductor mesa 653 above a layer 640 comprising semiconductor and isolation regions, and dielectric layer 630 on a wafer substrate 620. For example, the heater 605 can comprise an N+ or P+ polysilicon mesa 653 directly above a silicon layer 640 which is positioned above a buried oxide layer 630 of silicon-on-insulator (SOI) or bulk wafer.

The reference sensor 670 can be embedded within the silicon layer 640 directly below the polysilicon mesa 653 so that it is surrounded by and, therefore, thermally coupled to the heater 605. As illustrated, the reference sensor 670 comprises a pn junction diode that comprises a P+ diffusion region 671 adjacent to N+ diffusion regions 672 formed within the silicon layer. Thermal coupling between the heater 605 and the reference sensor 670 can be enhanced if the polysilicon mesa 653 overlaps diffused silicon 647 within the silicon layer 640 adjacent to the reference sensor 670 so as to allow better transfer of heat to the reference sensor 670. As mentioned above, it is anticipated that the reference sensor 670 can comprise a pn junction diode or any other thermally sensitive element such as, a thermistor, a bipolar transistor, or a FET.

Electrodes 660 can connect to opposing sides of the polysilicon mesa 653 so that the mesa 653 can receive the output current 690 from the comparator and, specifically, so that the current 690 can pass through the heater 605 and raise the temperature at the reference sensor 670. If the reference sensor 670 is a pn junction diode, as illustrated, then raising the temperature at the reference sensor will effectively reduce the resistance through the diode, thereby, decreasing the forward bias voltage output. Contrarily, if the reference sensor is a thermistor (not shown), then an increase in temperature at the reference sensor will increase the resistance, thereby, increasing the output voltage.

Figure 8:
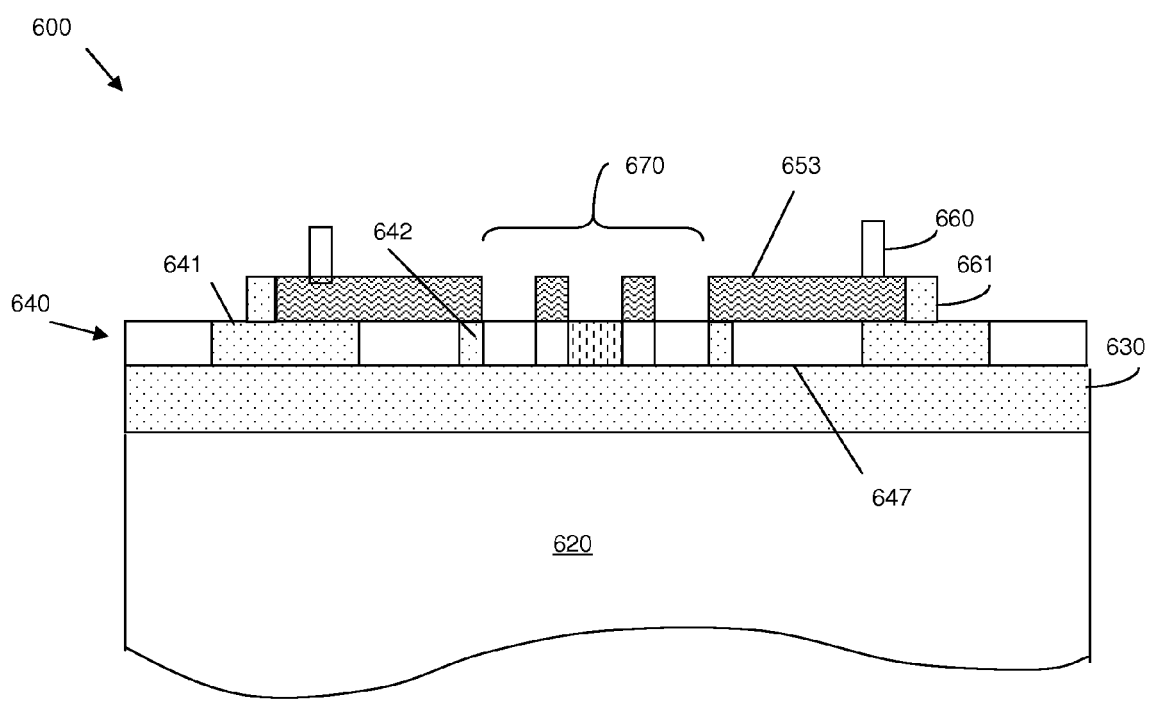
FIG. 8 is a diagram illustrating a variation on the structure of FIG. 6.

Isolation structures 641 (e.g., oxide or nitride filled STI structures) within the silicon layer 640 can electrically isolate the reference sensor 670 from other structures or devices within that layer 640 and isolation structures 661 can surround the sidewalls of the polysilicon mesa 653 to electrically isolate the heater 605. Additionally, referring to FIG. 8, isolation structures 642 can surround the sidewalls of the embedded reference sensor 670 to electrically isolate the reference sensor 670 from the current 690 flowing through the heater 605 and into the diffusion regions 647.

As with the previously described heater 305, in order to ensure that the heater 605 works with predictable and reproducible joule-heating characteristics in SOI technology (i.e., to ensure that the heater works independent of process variations), the diffused polysilicon mesa 653 can be formed such that its length 646 and width 645 are each less than the thickness 625 of the substrate 620 but greater than the thickness 635 of the buried oxide layer 630 (see FIGS. 6 and 7).

Referring again to FIGS. 1 and 2, in all embodiments of the invention, the comparator 101, 201 is also electrically connected to the heater 105, 205 so that the output current 114, 214 can drive the heater 105, 205 until the sensor outputs 112 and 113, 212 and 213 match (i.e., until the output 113, 213 of the reference sensor 103, 203 is equal to the output 112, 212 of the temperature sensor 102, 202). The circuits 100, 200 may further comprise n-FETs 111, 211 electrically connected between the comparator 101, 201 and the heater 105, 205 to form the output circuit of the comparator 101, 201 and, thereby, to ensure unidirectional current in the heater, 105, 205. This is to avoid a potential instability in the feedback loop. Additionally, the circuit 100, 200 can further comprise a register 107, 207 that is adapted to record the amount of current required to drive the heater 105, 205 so that second output (i.e., the output 113, 213 of the reference sensor 103, 203) equals the first output (i.e., the output 112, 212 of the temperature sensor 102, 202). Based on the recorded amount of current forced into the heater 105, 205, the temperature rise at the reference sensor 103, 203 can be calculated, which in this state, is equal to that of the temperature sensor 102, 202.

Thermal sensors often have variability from wafer to wafer and even from chip to chip. Due to this variability, on-chip thermal sensors often require extra calibration measurements that greatly increase the implementation costs. The temperature sensing circuit of the invention, described above, eliminates extra calibration measurements by providing a mechanism for self calibration of the on-chip temperature sensors. More specifically, it is only necessary to calibrate the heater of the circuit one time. This one-time calibration may be accomplished by either using simulation (e.g. computer assisted calculation of the thermal heating of the structure in response to the applied power to the heater, using the well-known physics of thermodynamics) or, alternatively, the calibration may be performed empirically, using hardware. In the latter case, one entire chip is heated to equilibrium using an external heat source and the output of the reference sensor is measured. The calibration of this particular sensor then has known response versus temperature. Next, the chip is allowed to cool, power is run to the on-chip heater and the output of the reference sensor is again measured. These measurements, together with the preceding set of measurements, are used to calibrate the temperature rise at the reference sensor versus the power input to the on-chip heater. Because of the restrictions on the length and width of the heater, the thermal response (temperature rise) of the heater to applied power will be nearly independent of process variations, for normal manufacturing tolerances, and this one-time calibration can be used for the entire production population of integrated circuits.

Figure 9:
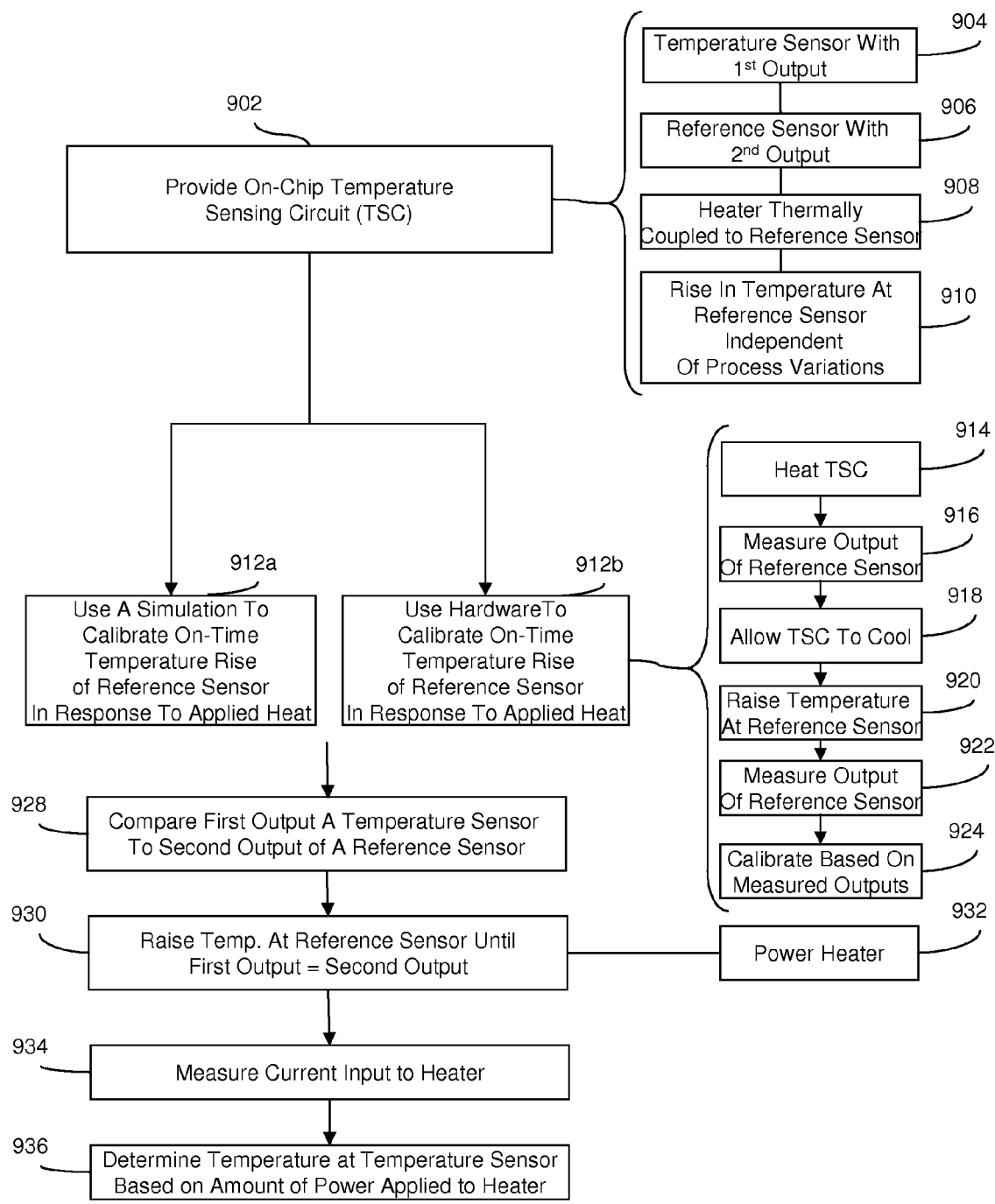
FIG. 9 is a flow diagram illustrating an embodiment of the method of the invention.

More particularly, FIG. 9 illustrates embodiments of a method of determining a temperature (i.e., a first temperature) at a specified on-chip location (i.e., a first location) by using an on-chip temperature sensing circuit (902). The method comprises forming an on-chip temperature sensing circuit, e.g., one of the circuits 100, 200 (described above and illustrated in FIGS. 1-8) (902-910). More specifically, the circuit 100, 200 can be formed so that the temperature at the reference sensor (i.e., the second temperature) can be raised independent of process variations (910). This can be accomplished, for example, by forming the heater with a diffused semiconductor mesa (e.g., either a polysilicon mesa on a semiconductor layer (see FIGS. 6 and 8) or silicon mesa (see FIGS. 3 and 5) above a buried oxide layer and a substrate of a chip. If the length and width of the semiconductor mesa are formed so that they are each less than the thickness of the substrate and are each greater the thickness of the buried oxide layer, then the second temperature will be independent of the process variations.

Once the circuit is formed (902-910), it can be calibrated (912a-b). More specifically, if the circuit is formed such that the temperature at the reference sensor (i.e., the second temperature) can be raised independent of process variations, then the circuit only needs to be calibrated one time. The circuit can be calibrated either by simulation (912a) or by using hardware (912b). Specifically, calibrating the circuit using hardware (912b) can be accomplished by heating the entire chip (914) and measuring the output of the reference sensor (i.e., a first value for the second output is determined) (916). After the chip has cooled (918), power is applied to the heater to raise the temperature at the reference sensor (920). Then, the output of the reference sensor is again measured (i.e., a second value for the second output is determined) (922). The temperature rise in response to the power applied to the heater can be calibrated based on the first and second values (924).

Once the circuit is calibrated (912*a-b*), the output of the temperature sensor at a specified location on the chip (i.e., the first output of the first temperature sensor at a first on-chip location) can be compared by the comparator to the output of the reference sensor (i.e., the second output of the second temperature sensor) (928). Then, the temperature at the reference sensor (i.e., the second temperature at the second location) is raised (e.g., by applying power to the heater and, specifically, by inputting the output current from the comparator into the heater) until the first output equals the second output (930-932). The amount of the power required to raise the second temperature until the first and second outputs are equal can be determined by measuring the current input (934). Based on this amount of power required, the temperature at the first temperature sensor can be determined (936).

Therefore, disclosed above are embodiments of an improved on-chip temperature sensing circuit, based on bolometry, which provides self calibration of the on-chip temperature sensors and an associated method of sensing temperature at a specific on-chip location. The circuit comprises a temperature sensor, an identical reference sensor with a thermally coupled heater and a comparator. The comparator is adapted to receive and compare the outputs from both the temperature and reference sensors and to drive the heater with current until the outputs match. Based on the current forced into the heater, the temperature rise of the reference sensor can be calculated, which in this state, is equal to that of the temperature sensor. The benefits of this invention include those stemming from the ability to accurately measure on-chip temperatures using temperature-sensitive elements which may vary significantly within the range on normal manufacturing process tolerances. Furthermore, because this invention can be implemented at low cost, significant savings in volume manufacturing and test costs can be afforded. Accurate temperature monitoring thus enabled can further benefit in improved circuit operation as pertains to power, speed, and reliability.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments of the invention can be practiced with modification within the spirit and scope of the appended claims.

What is claimed is:

1. A method of measuring a first temperature at a first location on a chip, said method comprising:
    forming an on-chip temperature sensing circuit comprising:
    a first temperature sensor at said first location on said chip, wherein said first temperature sensor is adapted to produce a first output that is temperature-sensitive; and
    a second temperature sensor at a second location on said chip, wherein said second temperature sensor is adapted to produce a second output that is temperature-sensitive;
    comparing said first output to said second output;
    raising a second temperature at said second location until said first output equals said second output; and
    determining said first temperature based on an amount of power required to raise said second temperature.

2. The method of claim 1, wherein said forming comprises thermally coupling said second temperature sensor to a heater.

3. The method of claim 2, wherein said raising of said second temperature comprises applying power to said heater by inputting a current into said heater.

4. The method of claim 3, wherein said amount of power is determined by measuring said current.

5. The method of claim 1, wherein said forming further comprises forming said temperature sensing circuit such that said raising of said second temperature is independent of process variations.

6. A method of measuring a first temperature at a first location on a chip, said method comprising:
    forming an on-chip temperature sensing circuit comprising:
    a first temperature sensor at said first location on said chip, wherein said first temperature sensor is adapted to produce a first output that is temperature-sensitive; and
    a second temperature sensor at a second location on said chip, wherein said second temperature sensor is adapted to produce a second output that is temperature-sensitive;
    calibrating said on-chip temperature sensing circuit;
    comparing said first output to said second output;
    raising a second temperature at said second location until said first output equals said second output; and
    determining said first temperature based on an amount of power required to raise said second temperature,
    wherein said forming of said on-chip temperature sensing circuit comprises thermally coupling said second temperature sensor to a heater, and
    wherein said calibrating comprises:
    heating said chip:
    determining a first value for said second output;
    applying power to said heater;
    determining a second value for said second output; and
    calibrating a temperature rise in response to said power based on said first value and said second value.

7. The method of claim 6, wherein said calibrating further comprises: after said determining of said first value and before said applying of said power to said heater, allowing said chip to cool.

8. The method of claim 6, wherein said raising of said second temperature comprises applying power to said heater by inputting a current into said heater.

9. The method of claim 6, wherein said amount of power is determined by measuring said current.

10. The method of claim 6, wherein said forming further comprises forming said temperature sensing circuit such that said raising of said second temperature is independent of process variations.

11. The method of claim 10, wherein said forming further comprises forming said heater with a diffused semiconductor mesa above a buried oxide layer and a substrate of a chip, wherein said semiconductor mesa is formed to have a length and a width that are each less than a first thickness of said substrate and are each greater than a second thickness of said buried oxide layer such that said raising of said second temperature is independent of said process variations.

12. The method of claim 6, wherein if said raising of said second temperature is independent of process variations, said calibrating comprises calibrating only a single time.

* * * * *